US009683334B2

(12) United States Patent
Robinson et al.

(10) Patent No.: US 9,683,334 B2
(45) Date of Patent: Jun. 20, 2017

(54) FREE-FLOWING COATED RUBBER PARTICLES, METHODS FOR THEIR PRODUCTION AND USE

(71) Applicant: Bayer MaterialScience LLC, Pittsburgh, PA (US)

(72) Inventors: Michael S. Robinson, Rocky Face, GA (US); Stephen J. Harasin, Morgan, PA (US); Michael T. Wellman, Moundsville, WV (US)

(73) Assignee: Covestro LLC, Pittsburgh, PA (US)

( * ) Notice: Subject to any disclaimer, the term of this patent is extended or adjusted under 35 U.S.C. 154(b) by 84 days.

(21) Appl. No.: 14/713,699

(22) Filed: May 15, 2015

(65) Prior Publication Data

US 2016/0333535 A1  Nov. 17, 2016

(51) Int. Cl.
| | |
|---|---|
| *E01C 13/08* | (2006.01) |
| *C09D 175/12* | (2006.01) |
| *B01J 2/30* | (2006.01) |
| *C08J 3/12* | (2006.01) |
| *C08G 18/66* | (2006.01) |
| *C08G 18/76* | (2006.01) |
| *C09D 175/04* | (2006.01) |
| *C08G 18/28* | (2006.01) |
| *C08G 18/32* | (2006.01) |

(52) U.S. Cl.
CPC ............ *E01C 13/08* (2013.01); *B01J 2/30* (2013.01); *C08G 18/289* (2013.01); *C08G 18/324* (2013.01); *C08G 18/667* (2013.01); *C08G 18/7664* (2013.01); *C08J 3/124* (2013.01); *C09D 175/04* (2013.01); *C09D 175/12* (2013.01)

(58) Field of Classification Search
None
See application file for complete search history.

(56) References Cited

U.S. PATENT DOCUMENTS

| | | |
|---|---|---|
| 3,436,243 A | 4/1969 | Kruger |
| 3,661,810 A | 5/1972 | Gahmig |
| 4,053,537 A | 10/1977 | Ruprecht et al. |
| 4,218,543 A | 8/1980 | Weber et al. |
| 4,337,283 A | 6/1982 | Haas, Jr. |
| 4,374,210 A | 2/1983 | Ewen et al. |
| 5,151,230 A | 9/1992 | Damberg |
| 5,202,371 A | 4/1993 | Goetz et al. |
| 5,604,277 A | 2/1997 | Osborn |
| 5,686,139 A | 11/1997 | Grimm et al. |
| 6,036,998 A | 3/2000 | Calvo et al. |
| 6,060,553 A | 5/2000 | Lenczyk et al. |
| 6,265,454 B1 | 7/2001 | McNutt et al. |
| 6,579,482 B1 | 6/2003 | Faust et al. |
| 6,706,787 B1 | 3/2004 | Burris et al. |
| 6,866,935 B1 | 3/2005 | Lee et al. |
| 6,896,964 B2 | 5/2005 | Kvesic |
| 7,101,926 B2 | 9/2006 | McMichael et al. |
| 8,680,165 B2 | 3/2014 | Cialone et al. |
| 2002/0119314 A1 | 8/2002 | Coffey |
| 2005/0003193 A1 | 1/2005 | Stroppiana |
| 2009/0318607 A1 | 12/2009 | Schutte et al. |
| 2011/0054080 A1 | 3/2011 | Berlineanu et al. |
| 2011/0189485 A1 | 8/2011 | Moura Bordado et al. |
| 2011/0305850 A1 | 12/2011 | Berlineanu et al. |
| 2012/0108732 A1 | 5/2012 | Nakayama et al. |
| 2012/0326351 A1 | 12/2012 | Ryan et al. |
| 2014/0058030 A1 | 2/2014 | Johnston et al. |

FOREIGN PATENT DOCUMENTS

| | | |
|---|---|---|
| DE | 10345964 A1 | 5/2005 |
| EP | 1416009 A1 | 5/2004 |
| JP | 2269127 A2 | 11/1990 |
| JP | 2007262390 A | 10/2007 |
| WO | 2010014024 A1 | 2/2010 |
| WO | 2014/009704 A1 | 1/2014 |

OTHER PUBLICATIONS

Daines, M.D., Richard F.; Saunders, Wendy E.; DOH State of New York Department of Health; Fact Sheet Crumb-Rubber Infilled Synthetic Turf Athletic Fields; Aug. 2008; Troy, NY.
Ludwico, W. A.; Taylor, R. P.; The Bayflex 110 Series—The New Generation of RIM Materials; Society of Automotive Engineers, Inc.; Sep. 26-30, 1977; Detriot, MI.

*Primary Examiner* — Alexandre Ferre
(74) *Attorney, Agent, or Firm* — Donald R. Palladino

(57) ABSTRACT

Disclosed are free-flowing particles. These free-flowing particles include: (a) a rubber particle, and (b) a coating deposited over at least a portion of the rubber particle, wherein the coating includes: (1) a polyurethane-urea resin that is a reaction product of a reaction mixture comprising: (i) a polyol having a number average molecular weight of 1800 to 12,000; (ii) an aromatic diamine; (iii) a polyisocyanate; and (iv) a catalyst for the reaction between hydroxyl groups and isocyanate groups; and (2) a solid particle anti-clumping agent. Also disclosed are methods of making and using such free-flowing particles and synthetic turf structures that include an infill of such free-flowing particles.

21 Claims, No Drawings

FREE-FLOWING COATED RUBBER PARTICLES, METHODS FOR THEIR PRODUCTION AND USE

FIELD

The present invention is directed to, among other things, free-flowing coated rubber particles in which the coating comprises a polyurethane-urea resin and solid particles, methods for making such particles, and methods for using such particles, such as an infill in a synthetic turf structure.

BACKGROUND

Rubber crumb particles are often used as an infill material in synthetic turf structures, such as are used in athletic fields, playgrounds, safety surfaces, running walking trails, landscaping walkways, and equestrian footing applications, among others. By "infill" it is meant that the particles are disposed and dispersed in between the vertically oriented fibers that are included in the structure to simulate natural grass. The infill helps to keep the fibers vertically oriented.

A disadvantage to the use of rubber crumb particles as infill in such applications, however, is that the particles tend to settle and pack very quickly. Because of their porous surface, rubber crumb particles can act as micro receptors for water to accumulate, which causes settling and hard packing and possibly acts as a site for the formation of bacteria. This condition can affect the safety aspects of the surface (due, for example, to head impacts, poor footing, etc.), affects the ability of the surface to drain water, and can sometimes require the periodic application of an antibacterial solution to the surface. To mitigate against these disadvantages, maintenance personnel must brush the surface often in order to "fluff up" the rubber crumb particles and, as indicated, may need to periodically apply an antibacterial solution to the surface. These mitigations are undesirable from, for example, a cost and safety perspective.

As a result, it would be desirable to provide improved free-flowing coated rubber particles that can be used as an infill in a synthetic turf structure, which addresses at least of some of the aforementioned disadvantages of prior infill particles.

SUMMARY OF THE INVENTION

In certain respects, the present invention is directed to a free-flowing particle. These free-flowing particles comprise: (a) a rubber particle, and (b) a coating deposited over at least a portion of the rubber particle, wherein the coating comprises (1) a polyurethane-urea resin that is a reaction product of a reaction mixture comprising: (i) a polyol having a number average molecular weight of 1800 to 12,000; (ii) an aromatic diamine; (iii) a polyisocyanate; and (iv) a catalyst for the reaction between hydroxyl groups and isocyanate groups; and (2) a solid particle anti-clumping agent.

In some respects, the present invention is directed to methods of making free-flowing particles. These methods comprise: (a) mixing rubber particles with an isocyanate-reactive composition comprising: (i) a polyol having a number average molecular weight of 1800 to 12,000; (ii) an aromatic diamine; and (iii) a catalyst for the reaction between hydroxyl groups and isocyanate groups to produce treated rubber particles; (b) mixing treated rubber particles produced in step (a) with a polyisocyanate to form rubber particles at least partially coated with a cured polyurethane-urea resin; and (c) mixing the coated rubber particles produced in step (b) with a solid particle anti-clumping agent.

In other respects, the present invention is directed to methods comprising infilling a synthetic turf athletic field with free-flowing particles comprising: (a) rubber particles; and (b) a coating deposited over at least a portion of the substrates particles, wherein the coating comprises: (i) a polyurethane-urea resin; and (ii) a solid particle anti-clumping agent.

In still other respects, the present invention is directed to synthetic turf structures comprising: (a) a primary backing sheet; (b) a plurality of fibers tufted into the primary backing sheet and extending substantially vertically away therefrom; and (c) an infill disposed between the fibers, wherein the infill comprises free-flowing particles comprising: (a) rubber particles; and (b) a coating deposited over at least a portion of the substrates particles, wherein the coating comprises: (i) a polyurethane-urea resin; and (ii) a solid particle anti-clumping agent.

DETAILED DESCRIPTION

Various embodiments are described and illustrated in this specification to provide an overall understanding of the structure, function, properties, and use of the disclosed inventions. It is understood that the various embodiments described and illustrated in this specification are non-limiting and non-exhaustive. Thus, the invention is not limited by the description of the various non-limiting and non-exhaustive embodiments disclosed in this specification. The features and characteristics described in connection with various embodiments may be combined with the features and characteristics of other embodiments. Such modifications and variations are intended to be included within the scope of this specification. As such, the claims may be amended to recite any features or characteristics expressly or inherently described in, or otherwise expressly or inherently supported by, this specification. Further, Applicant(s) reserve the right to amend the claims to affirmatively disclaim features or characteristics that may be present in the prior art. Therefore, any such amendments comply with the requirements of 35 U.S.C. §112 and 35 U.S.C. §132(a). The various embodiments disclosed and described in this specification can comprise, consist of, or consist essentially of the features and characteristics as variously described herein.

Any patent, publication, or other disclosure material identified herein is incorporated by reference into this specification in its entirety unless otherwise indicated, but only to the extent that the incorporated material does not conflict with existing definitions, statements, or other disclosure material expressly set forth in this specification. As such, and to the extent necessary, the express disclosure as set forth in this specification supersedes any conflicting material incorporated by reference herein. Any material, or portion thereof, that is said to be incorporated by reference into this specification, but which conflicts with existing definitions, statements, or other disclosure material set forth herein, is only incorporated to the extent that no conflict arises between that incorporated material and the existing disclosure material. Applicant(s) reserves the right to amend this specification to expressly recite any subject matter, or portion thereof, incorporated by reference herein.

In this specification, other than where otherwise indicated, all numerical parameters are to be understood as being prefaced and modified in all instances by the term "about", in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described in the present description should at least be construed in light of the number of reported significant digits and by applying ordinary rounding techniques.

Also, any numerical range recited in this specification is intended to include all sub-ranges of the same numerical precision subsumed within the recited range. For example, a range of "1.0 to 10.0" is intended to include all sub-ranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited in this specification is intended to include all lower numerical limitations subsumed therein and any minimum numerical limitation recited in this specification is intended to include all higher numerical limitations subsumed therein. Accordingly, Applicant(s) reserves the right to amend this specification, including the claims, to expressly recite any sub-range subsumed within the ranges expressly recited herein. All such ranges are intended to be inherently described in this specification such that amending to expressly recite any such sub-ranges would comply with the requirements of 35 U.S.C. §112 and 35 U.S.C. §132(a).

The grammatical articles "one", "a", "an", and "the", as used in this specification, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and may be employed or used in an implementation of the described embodiments. Further, the use of a singular noun includes the plural, and the use of a plural noun includes the singular, unless the context of the usage requires otherwise.

As indicated, certain embodiments of the present invention are directed a free-flowing particle. As used herein, the terms "particle" and "particulate" may be used interchangeably and refer to discrete closed three dimensionally shaped objects. The free-flowing particles of the present invention can have any of a variety of shapes, including, for example, generally spherical or elongated. In certain embodiments, the particles have an aspect ratio of from 1:1 (a perfect sphere) up to 1:100, up to 1:50, up to 1:20, or, in some cases, up to 1:10 or up to 1:5. As used herein, the "aspect ratio" of a particle is the ratio of the length of the shortest dimension of the particle to the length of the longest dimension of the particle.

As used herein, "free-flowing particle" refers to a dried particle that is not an aggregate of particles stuck or adhered to each other so as to form clumps. In some embodiments, "free-flowing particles" of the present invention have an angle of repose that is less than, for example, 60° degrees when the particles are passed through a 10 mesh sieve. Moreover, in some embodiments, the free-flowing particles of the present invention are such that at least 85% by weight, such as at least 90% by weight, or, in some cases, at least 95% by weight, of the particles are pourable after 1 week at 140° F./95% relative humidity.

As indicated, the free-flowing particles of the present invention comprise a rubber particle. As used herein, the term "rubber" refers to vulcanized elastomer materials that exhibit large and reversible elongations at low stresses. Rubbers are generally amorphous with a low glass transition temperature and some degree of crosslinking (vulcanization) to impart elastic material properties. Rubbers include, but are not limited to, natural and synthetic polyisoprene, polychloroprene (neoprene), polybutadiene, polyacrylonitrile, poly(styrene-co-butadiene), poly(acrylonitrile-co-butadiene), poly(isobutylene-co-isoprene), polysulfide rubbers, ethylene propylene diene monomer (EPDM) rubbers, butyl rubber, silicone rubbers, and the like. Rubber also includes blends and other combinations of vulcanized elastomer materials, including, but not limited to, tire rubber.

In some embodiments, the rubber particles are "crumb rubber". As used herein, the term "crumb rubber" refers to particles derived by reducing scrap rubber tire or other rubber material into particles. Generally, crumb rubber production processes for recycling tires include operations to remove any reinforcing materials such as steel and fiber, along with other contaminants such as dust, glass, rocks, and the like. Crumb rubber production processes include, but are not limited to, the grinding of vulcanized (crosslinked) rubber (for example, tire rubber) into crumb rubber particles of various sizes under ambient or cryogenic conditions.

Non-limiting examples of cryogenic grinding processes and apparatuses that produce rubber particles from recycled tires are described in U.S. Pat. Nos. 7,093,781; 7,108,207; and 7,445,170, which are incorporated by reference herein. In some embodiments, the free-flowing particles of the present invention comprise crumb rubber particles produced by the processes and/or with the apparatuses described in U.S. Pat. Nos. 7,093,781; 7,108,207; and/or 7,445,170. Such crumb rubber particles are also commercially available and include, for example, and include the PolyDyne™ and the MicroDyne™ lines of products commercially available from Lehigh Technologies Inc., Tucker, Ga., USA.

Tire rubber includes various different types of rubbers depending, for example, on the formulation, the type of tire, and the spatial location of the rubber material within the tire structure. In some embodiments of rubber particles produced from recycled tires, the rubber particles may contain a combination of several different rubbers, as well as other tire material components, such as, for example, thermoplastic polymers, carbon black, silica, clays, anti-oxidant compounds, anti-ozonant compounds, free sulfur, other free vulcanizing agents, oils, residual fibers, residual steel, other residual contaminants, and the like.

In certain embodiments, the rubber particles are produced from rubber recycled from non-tire sources or, in some embodiments, the rubber particles are produced from a virgin rubber or combinations of virgin rubbers. Rubber particles suitable for use in the present invention may also include various additives, for example, ingredients known in the art of rubber material production and processing.

In some embodiments, the rubber particles used in the present invention have an average particle size of 40 Mesh to 300 Mesh, as determined according to ASTM D5644-01: Standard Test Methods for Rubber Compounding Materials Determination of Particle Size Distribution of Recycled Vulcanizate Particulate Rubber, incorporated by reference herein, including any average particle size within any sub-range within 40 Mesh to 300 Mesh, as determined according to ASTM D5644-01. For example, in various embodiments, the average particle size of rubber particles used in the present invention may be no larger than 40 Mesh (approximately 400 microns), 80 Mesh (approximately 177 microns), 140 Mesh (approximately 105 microns), 200

Mesh (approximately 74 microns), or 300 Mesh (approximately 50 microns), as determined according to ASTM D5644-01.

In certain embodiments, the rubber particles have an average particle size in the range of 50 microns to 500 microns, including any value in any sub-range within 50 microns to 500 microns. For example, the rubber particles may have an average particle size no larger than 500 microns, 400 microns, 300 microns, 200 microns, 100 microns, 75 microns, or 50 microns.

In certain embodiments of the present invention, the free-flowing particles comprise ground rubber particles that are produced from recycled rubber tires and that have an average particle size of 40 Mesh to 300 Mesh, or any sub-range or value within 40 Mesh to 300 Mesh, as determined according to ASTM D5644-01. In certain embodiments, the free-flowing particles of the present invention comprise ground rubber particles that are produced from recycled rubber tires and that have an average particle size no larger than any value in the range of 50 microns to 500 microns, or any sub-range or value within 50 microns to 500 microns. In certain embodiments, the ground rubber particles produced from recycled rubber tires are cryogenically ground.

As indicated, the free-flowing particles of the present invention comprise a coating deposited over at least a portion of the rubber particle. In certain embodiments, the coating is a substantially or, in some cases, completely continuous film that cover at least 50%, at least 60%, at least 70%, at least 80%, at least 90%, or, in some cases, 100% of the surface of the rubber particle. In certain embodiments, the coating has a maximum film thickness of no more than 20 microns, such as no more than 10 microns, no more than 8 microns, no more than 7 microns, or, in some cases, no more than 6 microns.

The coating that is deposited over at least a portion of the rubber particle includes a polyurethane-urea resin that is a reaction product of a reaction mixture. The reaction mixture comprises: (a) an isocyanate-reactive composition; (b) a polyisocyanate; and (c) a catalyst for the reaction between hydroxyl groups and isocyanate groups.

In the present invention, the isocyanate-reactive composition comprises a polyol having a number average molecular weight of 1800 to 12,000, such as 3000 to 7000 or 5000 to 7000. The number average molecular weight values reported herein are determined by end group analysis, unless otherwise indicated.

In certain embodiments, such a polyol comprises a polyether polyol, such as those having at least 2, such as 2 or 3 hydroxyl groups per molecule and may be prepared, for example, by polymerization of epoxides, such as ethylene oxide, propylene oxide, butylene oxide, tetrahydrofuran, styrene oxide or epichlorohyrin, either on their own, in the presence of $BF_3$, or by a process of chemical addition of these epoxides, optionally as mixtures (such as mixtures of ethylene oxide and propylene oxide) or successively, to starting components having reactive hydrogen atoms, such as water, ammonia, alcohols, or amines. Examples of suitable starting components include ethylene glycol, propylene glycol-(1,3) or -(1,2), glycerol, trimethylolpropane, 4,4'-dihydroxy-diphenylpropane, aniline, ethanolamine or ethylene diamine. Sucrose-based polyether polyols may also be used. It is in many cases preferred to use polyethers which contain predominant amounts of primary OH groups (up to 90%, by weight, based on all the OH groups present in the polyether).

Also suitable are polyols which contain high molecular weight polyadducts or polycondensates in a finely dispersed form or in solution. Such compounds are obtained when polyaddition reactions (e.g. reactions between polyisocyanates and amino functional compounds) or polycondensation reactions (e.g. between formaldehyde and phenols and/or amines) are directly carried out in situ in the above-mentioned hydroxyl compounds. Processes for the production of this type of material have been described in German Auslegeschriften No. 1,168,075 and No. 1,260,142 and in German Offenlegungsschriften Nos. 2,324,134; 2,423,984; 2,512,385; 2,513,815; 2,550,796; 2,550,797; 2,550,833 and No. 2,550,862. Such polyhydroxyl compounds may also be obtained according to U.S. Pat. No. 3,869,413 or German Offenlegungsschrift No. 2,550,860 by mixing an aqueous polymer dispersion with a polyhydroxyl compound and then removing water from the mixture.

In certain embodiments, such a polyol comprises a polyester polyol, such as reaction products of polyhydric, such as dihydric alcohols and/or trihydric alcohols, and polybasic, such as dibasic, carboxylic acids. Instead of free polycarboxylic acids, the corresponding polycarboxylic acid anhydrides or corresponding polycarboxylic acid esters of lower alcohols or mixtures thereof may be used. The polycarboxylic acids may be aliphatic, cycloaliphatic, aromatic and/or heterocyclic and they may be substituted, e.g. by halogen atoms, and/or may be unsaturated. Suitable exemplary polycarboxylic acids include, but are not limited to, succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids, such as oleic acid, optionally mixed with monomeric fatty acids, dimethyl terephthalate and terephthalic acid-bis-glycol esters. Exemplary suitable polyhydric alcohols include, but are not limited to, ethylene glycol, propylene glycol-(1,2) and -(1,3), butylene glycol-(1,4) and -(2,3), hexanediol-(1,6), octanediol-(1,8), neopentylglycol, cyclohexanedimethanol (1,4-bis-hydroxy-methylcyclohexane), 2-methyl-1,3-propanediol, glycerol, trimethylolpropane, hexanetriol-(1,2,6), butanetriol-(1,2,4), trimethylolethane, pentaerythritol, quinitol, mannitol and sorbitol, methyl glycoside, diethylene glycol, triethylene glycol, tetraethylene glycol, polyethylene glycols, dipropylene glycol, polypropylene glycols, dibutylene glycol and polybutylene glycols. The polyesters may also contain a proportion of carboxyl end groups. Polyesters of lactones, such as ε-caprolactone, or hydroxycarboxylic acids, such as ω-hydroxycaproic acid, may also be used.

Such polyols may also comprise polycarbonate polyols, such as the reaction product of diols, such as propanediol-(1,3), butanediol-(1,4) and/or hexanediol-(1,6), diethylene glycol, triethylene glycol or tetraethylene glycol, with diarylcarbonates, such as diphenylcarbonate, or phosgene.

In certain embodiments, the polyol having a number average molecular weight of 1800 to 12,000, as described above, is present in an amount of at least 50% by weight, such as at least 60% by weight, based on the total weight of the isocyanate-reactive composition.

In the present invention, the isocyanate-reactive composition also comprises an aromatic diamine, such as those which contain at least one alkyl substituent in the ortho-position to a first amino group and two alkyl substituents in the ortho-position to a second amino group or mixtures thereof. In some embodiments, at least two of said alkyl substituents contain at least two carbon atoms. In certain embodiments, the reactivity of said diamine towards isocyanates has not been reduced by electron attracting substituents, such as halogen, ester, ether or disulphide groups, as is the case, for example, with methylene-bis-chloroaniline (MOCA). In certain embodiments, such diamines do not contain other functional groups reactive with isocyanates. In certain embodiments, the foregoing mentioned alkyl substituent can have as many as twenty carbon atoms and can be straight or branched long chains.

In certain embodiments, the aromatic diamine contains at least one alkyl substituent in the ortho-position to a first amino group and two alkyl substituents having from 1 to 3 carbon atoms in the ortho-position to a second amino group, provided that two of these alkyl substituents contain two or three carbon atoms. Examples of such aromatic diamines include: 1-methyl-3,5-diethyl-2,4-diaminobenzene, 1-methyl-3,5-diethyl-2,6-diaminobenzene, 1,3,5-triethyl-2, 6-diaminobenzene, and 3,5,3',5'-tetraethyl-4,4'-diaminodiphenylmethane.

The above-mentioned aromatic amines may, of course, be used as mixtures with each other or in combination with other active aromatic amines.

In certain embodiments, aromatic diamines which have a linear alkyl substituent having from 1 to 3 carbon atoms in both ortho-positions to each amino group, provided that two of the alkyl substituents contain two or three carbon atoms, are used. In some embodiments, the diamine is liquid at room temperature and miscible with polyols, particularly with polyether polyols. An example of such a compound is 1-methyl-3,5-diethyl-2,4-diaminobenzene or a mixture of this compound with 1-methyl-3,5-diethyl-2,6-diaminobenzene.

In certain embodiments, the aromatic amine is present in an amount of 5 to 50% by weight, such as 10 to 30% by weight, or, in some cases, 15 to 25% by weight, based on the total weight of the isocyanate-reactive composition.

In certain embodiments of the present invention, the isocyanate-reactive composition also comprises an aminosilane having the formula:

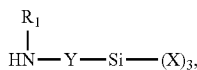

in which: (A) each X, which may be the same or different, is an organic group that is inert to isocyanate groups below 100° C., provided that at least one of these groups are alkoxy or acyloxy groups, such as where each X is an alkyl or alkoxy group having 1 to 4 carbon atoms, such as where each X is an alkoxy group having 2 carbon atoms; (B) Y is a linear or branched alkylene group containing 1 to 8 carbon atoms, such as a linear group containing 2 to 4 carbon atoms or a branched group containing 5 to 6 carbon atoms, such as a linear group containing 3 carbon atoms; and (C) $R_1$ is hydrogen or an organic group which is inert to isocyanate groups at a temperature of 100° C. or less, such as an alkyl, cycloalkyl, or aromatic group having 1 to 12 carbon atoms, or $R^1$ represents a group corresponding to the formula:

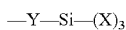

in which X and Y have the same meanings described above.

In certain embodiments, each X represents a methoxy, ethoxy, or propoxy group, and Y is a linear alkylene group containing 3 carbon atoms (i.e., a propylene group) and $R_1$ is hydrogen.

In certain embodiments of the present invention, the aminosilane is present in an amount of 0.1 to 10% by weight, such as 1 to 5% by weight, or, in some cases, 2 to 4% by weight, based on the total weight of the isocyanate-reactive composition.

In some embodiments of the present invention, the isocyanate-reactive composition also comprises a low molecular weight polyol having a number average molecular weight of from 250 to less than 1,800, such as from 250 to less than 1,500 or 250 to 800; number averaged equivalent weights of from 80 to 750, such as from 85 to 300; and a number averaged isocyanate reactive group functionality of from 2 to 10, such as 2 to 4 or 2 to 3. Such compounds include, for example, polyether or polyester polyols containing primary and/or secondary hydroxyl groups.

In certain embodiments of the present invention, such a low molecular weight polyol is present in an amount of 1 to 15% by weight, such as 5 to 15% by weight, based on the total weight of the isocyanate-reactive composition.

As indicated, the coating that is deposited over at least a portion of the rubber particle includes a product of a reaction mixture that comprises a polyisocyanate. Suitable polyisocyanates include aromatic, aliphatic, and/or cycloaliphatic polyisocyanates. Aromatic, aliphatic, and/or cycloaliphatic polyisocyanates may include monomeric organic diisocyanates represented by the formula, $R(NCO)_2$, in which R represents an organic group, such as a divalent aliphatic hydrocarbon group having from 4 to 18 carbon atoms, a divalent cycloaliphatic hydrocarbon group having from 5 to 15 carbon atoms, a divalent araliphatic hydrocarbon group having from 7 to 15 carbon atoms, or a divalent aromatic hydrocarbon group having 6 to 15 carbon atoms.

Examples of suitable diisocyanates include: 1,4-tetramethylene diisocyanate; 1,6-hexamethylene diisocyanate (HDI); 2,2,4-trimethyl-1,6-hexamethylene diisocyanate; 1,12-dodecamethylene diisocyanate; cyclohexane-1,3- and -1,4-diisocyanate; 1-isocyanato-2-isocyanatomethyl cyclopentane; 1-isocyanato-3-isocyanatomethyl-3,5,5-trimethyl-cyclohexane (isophorone diisocyanate or IPDI), bis-(4-isocyanato-cyclohexyl)-methane; 1,3- and 1,4-bis-(isocyanatomethyl)-cyclohexane; bis-(4-isocyanatocyclohexyl)-methane; 2,4'-diisocyanato-dicyclohexyl methane; bis-(4-isocyanato-3-methyl-cyclohexyl)-methane; α,α,α', α'-tetramethyl-1,3- and/or -1,4-xylylene diisocyanate; 1-isocyanato-1-methyl-4(3)-isocyanatomethyl cyclohexane; 2,4- and/or 2,6-hexahydro-toluylene diisocyanate; 1,3- and/or 1,4-phenylene diisocyanate; 2,4- and/or 2,6-toluene diisocyanate; 2,4- and/or 4,4'-diphenylmethane diisocyanate (MDI); 1,5-diisocyanato naphthalene; and combinations of any thereof.

Monomeric polyisocyanates containing three or more isocyanate groups such as 4-isocyanatomethyl-1,8-octamethylene diisocyanate and aromatic polyisocyanates such as 4,4',4''-triphenylmethane triisocyanate and polyphenyl polymethylene polyisocyanates obtained by phosgenating aniline/formaldehyde condensates may also be used. Also suitable are polyisocyanate adducts prepared from monomeric polyisocyanates (including diisocyanates) and containing isocyanurate, uretdione, biuret, urethane, allophanate, iminooxadiazine dione, carbodiimide, and/or oxadiazinetrione groups.

In certain embodiments of the present invention, the polyisocyanate that is used comprises diphenylmethane 2,2'- and/or 2,4'- and/or 4,4'-diisocyanate (MDI) or higher homologs of MDI (polymeric MDI), including polyphenylpolymethylene polyisocyanates obtained, for example, by aniline-formaldehyde condensation followed by phosgenation.

In certain embodiments, the polyisocyanate has a viscosity, at 25° C., of no more than 300 mPa·s, when measured using a Brookfield DVE viscometer, spindle #6.

One example of a suitable polyisocyanate is that which is commercially available from Bayer MaterialScience LLC under the name Mondur® MR 5 (a polymeric diphenylmethane diisocyanate (pMDI) containing pure (monomeric) MDI, NCO content of at least 31.8 wt % and viscosity at 25° C. of 50-90 mPa·s).

In certain embodiments of the present invention, the polyisocyanate and isocyanate-reactive composition are each used in amounts such that the reaction mixture has an NCO Index (i.e., the ratio of the total number of reactive isocyanate groups present to the total number of isocyanate-reactive groups that can react with the isocyanate multiplied by 100) is at least 90, such at least 99, or at least 100 and no more than 300, such as no more than 110 or, in some cases, no more than 105. In certain embodiments, the NCO index is 105.

As indicated, the reaction mixture used in the present invention comprises a catalyst for the reaction between hydroxyl groups and isocyanate groups. Suitable catalysts include, for example, organic tin compounds such as tin (II) salts of carboxylic acids (such as tin (II) acetate, tin (II) octoate, tin (II) ethyl hexoate or tin (II) laurate), and the dialkyl tin salts of carboxylic acids (such as dibutyl tin diacetate, dibutyl tin dilaurate, dibutyl tin maleate or dioctyl tin diacetate) either alone or as a complex with amidines, such as 2,3-dimethyl-3,4,5,6-tetrahydropyrimidine or 2-methyl-3-cyclohexyl-3,4,5,6-tetrahydropyrimidine, aminopyridines, aminopyrimidines, hydrazino pyridines or hydrazino pyrimidines.

Other catalysts which may be used include tertiary amines, such as triethylamine, tributylamine, N-methylmorpholine, N-ethylmorpholine, N-cocomorpholine, N,N,N',N'-tetramethyl-ethylenediamine, 1,4-diaza-bicyclo-(2,2,2)-octane, N-methyl-N'-dimethylaminoethyl-piperazine, N,N-dimethylbenzylamine, bis-(N,N-diethylamino-ethyl)-adipate, N,N-diethylbenzylamine, pentamethyl-diethylenetriamine, N,N-dimethylcyclohexylamine, N,N,N',N'-tetramethyl-1,3-butanediamine, N,N-dimethyl-β-phenylethylamine, 1,2-dimethylimidazole and 2-methylimidazole.

Tertiary amines having isocyanate-reactive hydrogen atoms include, for example, triethanolamine, triisopropanolamine, N-methyl-diethanolamine, N-ethyl-diethanolamine, and N,N-dimethyl-ethanolamine may also be used. Reaction products of these compounds with alkylene oxides, such as propylene oxide and/or ethylene oxide are also suitable.

Silaamines having carbon-silicon bonds as described, e.g. in German Pat. No. 1,229,290 may also be used as catalysts. Examples include 2,2,4-trimethyl-2-silamorpholine or 1,3-diethylaminomethyl-tetramethyl-disiloxane.

Basic nitrogen compounds, such as tetraalkylammonium hydroxides, alkali metal hydroxides such as sodium hydroxide, alkali metal phenolates, such as sodium phenolate, and alkali metal alcoholates, such as sodium methylate, may also be used as catalysts. Hexahydrotriazines are also suitable catalysts.

In certain embodiments, the catalyst comprises (i) an organic tin compound, such as a dialkyl tin salt of carboxylic acid, such as dibutyl tin dilaurate, and (ii) a tertiary amine, such as 1,4-diaza-bicyclo-(2,2,2)-octane. In certain embodiments, the relative weight ratio of (i) to (ii) is 20:80 to 80:20, such as 40:60 to 60:40.

In certain embodiments, the catalyst is present in the reaction mixture in an amount of from 0.01 to 10% by weight, such as 0.05 to 1% by weight, based on the total weight of isocyanate-reactive components.

The catalysts to be used according to the present invention should accelerate the polyaddition reaction to such an extent that once the starting components have been mixed the reaction mixture has a flow time (e.g., the capability to flow and hence the time during which the mixture may still be delivered) of less than 15, 10, or 5 seconds.

The reaction mixture used in the present invention may comprise any of a variety of optional ingredients, such as, but not limited to, blowing agents, such as water and/or volatile organic substances and/or dissolved inert gases, examples of which include ethyl acetate; methanol; ethanol; halogen substituted alkanes, such as methylene chloride, chloroform, ethylidene chloride, vinylidene chloride, monofluorotrichloromethane, chlorodifluoromethane or dichlorodifluoromethane; butane; hexane; heptane; diethyl ether; nitrogen; air; and carbon dioxide Surface-active additives (emulsifiers and foam stabilizers) may also be used. Examples include the sodium salts of ricinoleic sulphonates or of fatty acids, or salts of fatty acids with amines, such as oleic acid diethylamine or stearic acid diethanolamine, alkali metal or ammonium salts of sulphonic acids, such as dodecylbenzene sulphonic acid or dinaphthylmethane disulphonic acid, or of fatty acids, such as ricinoleic acid, or of polymeric fatty acids, and water-soluble polyether siloxanes that have a polydimethylsiloxane group attached to a copolymer of ethylene oxide and propylene oxide.

Cell regulators, such as paraffins or fatty alcohols or dimethylpolysiloxanes, pigments, dyes, flame retarding agents, such as bis-chloroethylphosphate or ammonium phosphate and polyphosphate, stabilizers against ageing and weathering, plasticizers, fungistatic and bacteriostatic substances and fillers, such as barium sulphate, carbon black or whiting, may also be used.

In certain embodiments, the reaction mixture is present in an amount of at least 0.5% by weight, such as at least 1% by weight or at least 2% by weight and up to 20% by weight, up to 10% by weight, or, in some cases, up to 6% by weight, based on the total weight of rubber particles.

As previously indicated, the coating deposited over at least a portion of the rubber particle in the present invention also includes a solid particle anti-clumping agent. Anti-clumping agents are materials that, when present in the coating used in the present invention in an effective amount, act to prevent the free-flowing particles of the present invention from clumping or aggregating, thereby enabling the production of the free-flowing and pourable particles described herein even after being stored for 1 week at 140° F./95% relative humidity.

Suitable solid anti-clumping agents include, for example, silica, such as fumed silica, organic bentonite, hydrogenated castor oil and polyamides. In certain embodiments, the anti-clumping agents do not impart any color to the coating when viewed by the naked eye and, as such, do not act as a colorant.

In certain embodiments, the solid particle anti-clumping agent has an average particle size of at least 0.1 microns, such as at least 0.5 microns and no more than 10 microns, such as no more than 5 microns.

In the present invention, the solid particle anti-clumping agent is employed in an amount effective to produce the free-flowing, pourable particles described herein. In certain embodiments, the solid particle anti-clumping agent, such as fumed silica, is present in an amount of at least about 0.5% by weight, such as at least 1% by weight or, in some cases, at least 5% by weight and up to 20% by weight, such as up to 10% by weight, based on the total weight of the reaction mixture. In certain embodiments, the solid particle anti-clumping agent is present in an amount of at least 0.05% by weight, such as at least 0.1% by weight, or, in some cases, at least 0.2% by weight and up to 2% by weight, such as up to 1% by weight, or, in some cases, up to 0.5% by weight, based on the total weight of the sum of the reaction mixture and the rubber particles.

As previously indicated, some embodiments of the present invention are directed to methods of making free-flowing particles. These methods comprise: (a) mixing rubber particles, such as those described above, with an isocyanate-reactive composition comprising: (i) a polyol having a number average molecular weight of 1800 to 12,000; (ii) an aromatic diamine; and (iii) a catalyst for the reaction between hydroxyl groups and isocyanate groups to produce treated rubber particles; (b) mixing treated rubber particles produced in step (a) with a polyisocyanate to form rubber particles at least partially coated with a cured polyurethane-urea resin; and (c) mixing the coated rubber particles produced in step (b) with a solid particle anti-clumping agent.

It is currently believed, surprisingly, that the foregoing process is critical to achieving free-flowing particles of the present invention. It is believed that, by using such a process, formation of a continuous cured coating on the rubber particles is first achieved, which keeps the rubber particles dispersed. The use of a fast reacting system in which the polyisocyanate reacts with the isocyanate-reactive composition to form a cured polyurethane-urea coating prior to addition of the solid particle anti-clumping agent is surprisingly believed to be critical to achieved the free-flowing particles of the present invention, since it is believed that this process results in the solid particle anti-clumping agent remaining at the coating surface, rather than migrating into the coating, thereby allowing the solid particle anti-clumping agent to effectively prevent clumping of the free-flowing particles. As a result, in certain embodiments of the present invention, the free-flowing particles comprise: (a) a rubber particle, and (b) a coating deposited over at least a portion of the rubber particle and having an inner surface adhered to the rubber particle and an outer surface, wherein the coating comprises: (1) a polyurethane-urea resin that is a reaction product of a reaction mixture of the type described above and (2) a solid particle anti-clumping agent, in which the solid particle anti-clumping agent is disposed at the outer surface of the coating. In certain embodiments, a majority of the surface area of the solid particle anti-clumping agent is not disposed beneath the outer surface of the coating.

Some embodiments of the present invention are directed to use of the previously-described free-flowing particles of the present invention, and made by the previously-described methods of the present invention, as an infill in a synthetic turf athletic field. As a result, certain embodiments of the present invention are directed to methods comprising infilling a synthetic turf athletic field with free-flowing particles comprising: (a) rubber particles; and (b) a coating deposited over at least a portion of the substrates particles, wherein the coating comprises: (i) a polyurethane-urea resin; and (ii) a solid particle anti-clumping agent.

Other embodiments of the present invention are directed to synthetic turf structures comprising: (a) a primary backing sheet; (b) a plurality of fibers tufted into the primary backing sheet and extending substantially vertically away therefrom; and (c) an infill disposed between the fibers, wherein the infill comprises previously-described free-flowing particles of the present invention, and made by the previously-described methods of the present invention. In some embodiments, the synthetic turf structure is used as an athletic field, a playground, a safety surface, a running or walking trail, a landscaping walkway, or an equestrian footing application.

The primary backing sheet of the synthetic turf structure of the present invention may be constructed of, for example, woven or non-woven polypropylene or polyester. In some cases, the primary backing sheet comprises a polypropylene or polyester multifilament composite structure with glass fiber and/or polyester woven scrims and a polypropylene fleece. The plurality of fibers that are tufted into the primary backing sheet and extend away therefrom may be constructed of a polymeric material, such as a polypropylene, a polyester, nylon, a polyolefin (including polypropylene or polyethylene), or other polymers and are, in some embodiments, colored so as to simulate natural grass or turf. One of the functions of the infill is to maintain the fibers in a position such that they extending substantially vertically away from the primary backing sheet, thereby enabling an appearance simulating natural turf or grass. In some embodiments, the synthetic turf structure also comprises a backing coating that is constructed of, for example, latex or a polyurethane elastomer. The backing coating is adhered to the primary backing sheet and locks the fibers into the primary backing sheet.

In certain respects, the present invention is directed to a free-flowing particle. These free-flowing particles comprise: (a) a rubber particle, and (b) a coating deposited over at least a portion of the rubber particle, wherein the coating comprises (1) a polyurethane-urea resin that is a reaction product of a reaction mixture comprising: (i) a polyol having a number average molecular weight of 1800 to 12,000; (ii) an aromatic diamine; (iii) a polyisocyanate; and (iv) a catalyst for the reaction between hydroxyl groups and isocyanate groups; and (2) a solid particle anti-clumping agent.

Certain embodiments of the present invention are directed to free-flowing particles of the previous paragraph, wherein the free-flowing particles have an angle of repose that is less than 60° degrees when the particles are passed through a 10 mesh sieve.

In some embodiments, the present invention is directed to free-flowing particles of either of the previous two paragraphs, wherein at least 85% by weight, such as at least 90% by weight, or, in some cases, at least 95% by weight, of the particles are pourable after 1 week at 140° F./95% relative humidity.

In certain embodiments, the present invention is directed to free-flowing particles of any of the previous three paragraphs, wherein the rubber particles comprise crumb rubber, such as crumb rubber produced from recycled tires that contain a combination of different rubbers and other tire material components, such as thermoplastic polymers, carbon black, silica, clays, anti-oxidant compounds, anti-ozonant compounds, free sulfur, other free vulcanizing agents, oils, residual fibers, residual steel, or other residual contaminants.

Some embodiments of the present invention are directed to free-flowing particles of any of the previous four paragraphs, wherein the rubber particles have an average particle size of 40 Mesh to 300 Mesh, as determined according to ASTM D5644-01: Standard Test Methods for Rubber Compounding Materials Determination of Particle Size Distribution of Recycled Vulcanizate Particulate Rubber, or, in some cases, no larger than 40 Mesh (approximately 400 microns), 80 Mesh (approximately 177 microns), 140 Mesh (approximately 105 microns), 200 Mesh (approximately 74 microns), or 300 Mesh (approximately 50 microns), as determined according to ASTM D5644-01.

In some cases, the present invention is directed to free-flowing particles of any of the previous five paragraphs, wherein the rubber particles have an average particle size of 50 microns to 500 microns, and, in some cases, no larger than 500 microns, 400 microns, 300 microns, 200 microns, 100 microns, 75 microns, or 50 microns.

In some embodiments, the present invention is directed to free-flowing particles of any of the previous six paragraphs, wherein the coating is a substantially or, in some cases, completely continuous film that covers at least 50%, at least 60%, at least 70%, at least 80%, at least 90%, or, in some cases, 100% of the surface of the rubber particle and/or has a maximum film thickness of no more than 20 microns, such as no more than 10 microns, no more than 8 microns, no more than 7 microns, or, in some cases, no more than 6 microns.

In certain embodiments, the present invention is directed to free-flowing particles of any of the previous seven paragraphs, wherein the isocyanate-reactive composition comprises a polyol having a number average molecular weight of 3000 to 7000 or 5000 to 7000.

Some embodiments of the present invention are directed to free-flowing particles of any of the previous eight paragraphs, wherein, the polyol comprises a polyether polyol, such as those having at least 2, such as 2 or 3 hydroxyl groups per molecule and that is prepared, for example, by polymerization of epoxides, such as ethylene oxide, propylene oxide, butylene oxide, tetrahydrofuran, styrene oxide or epichlorohyrin, either on their own, in the presence of $BF_3$, or by a process of chemical addition of these epoxides, optionally as mixtures (such as mixtures of ethylene oxide and propylene oxide) or successively, to starting components having reactive hydrogen atoms, such as water, ammonia, alcohols, or amines.

In some embodiments, the present invention is directed to free-flowing particles of any of the previous nine paragraphs, wherein the polyol having a number average molecular weight of 1800 to 12,000 is present in an amount of at least 50% by weight, such as at least 60% by weight, based on the total weight of the isocyanate-reactive composition.

In certain embodiments, the present invention is directed to free-flowing particles of any of the previous ten paragraphs, wherein the aromatic diamine comprises at least one alkyl substituent in the ortho-position to a first amino group and two alkyl substituents in the ortho-position to a second amino group, such as where at least two of said alkyl substituents contain at least two carbon atoms, such as where the reactivity of said diamine towards isocyanates has not been reduced by electron attracting substituents, such as halogen, ester, ether or disulphide groups, as is the case, for example, with methylene-bis-chloroaniline (MOCA). In certain embodiments, the aromatic diamine contains at least one alkyl substituent in the ortho-position to a first amino group and two alkyl substituents having from 1 to 3 carbon atoms in the ortho-position to a second amino group, provided that two of these alkyl substituents contain two or three carbon atoms, such as is the case with 1-methyl-3,5-diethyl-2,4-diaminobenzene, 1-methyl-3,5-diethyl-2,6-diaminobenzene, 1,3,5-triethyl-2,6-diaminobenzene, and 3,5,3',5'-tetraethyl-4,4'-diaminodiphenylmethane.

In certain embodiments, the present invention is directed to free-flowing particles of any of the previous eleven paragraphs, in which the aromatic diamine has a linear alkyl substituent having from 1 to 3 carbon atoms in both ortho-positions to each amino group, provided that two of the alkyl substituents contain two or three carbon atoms, such as those that are liquid at room temperature and miscible with polyols, particularly with polyether polyols, such as is the cases with 1-methyl-3,5-diethyl-2,4-diaminobenzene or a mixture of this compound with 1-methyl-3,5-diethyl-2,6-diaminobenzene.

In some embodiments, the present invention is directed to free-flowing particles of any of the previous twelve paragraphs, wherein the aromatic amine is present in an amount of 5 to 50% by weight, such as 10 to 30% by weight, or, in some cases, 15 to 25% by weight, based on the total weight of the isocyanate-reactive composition.

Some embodiments of the present invention are directed to free-flowing particles of any of the previous thirteen paragraphs, wherein the isocyanate-reactive composition also comprises an aminosilane having the formula:

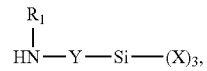

in which: (A) each X, which may be the same or different, is an organic group that is inert to isocyanate groups below 100° C., provided that at least one of these groups are alkoxy or acyloxy groups, such as where each X is an alkyl or alkoxy group having 1 to 4 carbon atoms, such as where each X is an alkoxy group having 2 carbon atoms; (B) Y is a linear or branched alkylene group containing 1 to 8 carbon atoms, such as a linear group containing 2 to 4 carbon atoms or a branched group containing 5 to 6 carbon atoms, such as a linear group containing 3 carbon atoms; and (C) $R_1$ is hydrogen or an organic group which is inert to isocyanate groups at a temperature of 100° C. or less, such as an alkyl, cycloalkyl, or aromatic group having 1 to 12 carbon atoms, or $R^1$ represents a group corresponding to the formula:

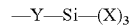

in which X and Y have the same meanings described above, such as where each X represents a methoxy, ethoxy, or propoxy group, and Y is a linear alkylene group containing 3 carbon atoms (i.e., a propylene group) and $R_1$ is hydrogen. In some of these embodiments, the aminosilane is present in an amount of 0.1 to 10% by weight, such as 1 to 5% by weight, or, in some cases, 2 to 4% by weight, based on the total weight of the isocyanate-reactive composition.

Some embodiments of the present invention are directed to free-flowing particles of any of the previous fourteen paragraphs, wherein the isocyanate-reactive composition comprises a low molecular weight polyol having a number average molecular weight of from 250 to less than 1,800, such as from 250 to less than 1,500 or 250 to 800; a number averaged equivalent weight of from 80 to 750, such as from 85 to 300; and a number averaged isocyanate reactive group functionality of from 2 to 10, such as 2 to 4 or 2 to 3, such as polyether or polyester polyols containing primary and/or secondary hydroxyl groups. In some of these embodiments, such a low molecular weight polyol is present in an amount of 1 to 15% by weight, such as 5 to 15% by weight, based on the total weight of the isocyanate-reactive composition.

In certain embodiments, the present invention is directed to free-flowing particles of any of the previous fifteen paragraphs, wherein the polyisocyanate comprises diphenylmethane 2,2'- and/or 2,4'- and/or 4,4'-diisocyanate (MDI) or a higher homolog of MDI (polymeric MDI), including a polyphenylpolymethylene polyisocyanate obtained, for example, by aniline-formaldehyde condensation followed by phosgenation. In some of these embodiments, the polyisocyanate has a viscosity, at 25° C., of no more than 300 mPa·s, when measured using a Brookfield DVE viscometer, spindle #6.

In some embodiments, the present invention is directed to free-flowing particles of any of the previous sixteen paragraphs, wherein the polyisocyanate and isocyanate-reactive composition are each used in amounts such that the reaction mixture has an NCO Index of at least 90, such at least 99, or at least 100 and no more than 300, such as no more than 110 or, in some cases, no more than 105, such as where the NCO index is 105.

In certain embodiments, the present invention is directed to free-flowing particles of any of the previous seventeen paragraphs, wherein the catalyst comprises (i) an organic tin compound, such as a dialkyl tin salt of carboxylic acid, such as dibutyl tin dilaurate, and (ii) a tertiary amine, such as 1,4-diaza-bicyclo-(2,2,2)-octane, such as where the relative weight ratio of (i) to (ii) is 20:80 to 80:20, such as 40:60 to 60:40.

In certain embodiments, the present invention is directed to free-flowing particles of any of the previous eighteen paragraphs, wherein the reaction mixture has a flow time of less than 15, 10, or 5 seconds.

In some embodiments, the present invention is directed to free-flowing particles of any of the previous nineteen paragraphs, wherein the reaction mixture is present in an amount of at least 0.5% by weight, such as at least 1% by weight or at least 2% by weight and up to 20% by weight, up to 10% by weight, or, in some cases, up to 6% by weight, based on the total weight of rubber particles.

Some embodiments of the present invention are directed to free-flowing particles of any of the previous twenty paragraphs, wherein the solid particle anti-clumping agent comprises silica, such as fumed silica.

In some embodiments, the present invention is directed to free-flowing particles of any of the previous twenty-one paragraphs, wherein the solid particle anti-clumping agent has an average particle size of at least 0.1 microns, such as at least 0.5 microns and no more than 10 microns, such as no more than 5 microns and/or is present in an amount of at least about 0.5% by weight, such as at least 1% by weight or, in some cases, at least 5% by weight and up to 20% by weight, such as up to 10% by weight, based on the total weight of the reaction mixture and/or is present in an amount of at least 0.05% by weight, such as at least 0.1% by weight, or, in some cases, at least 0.2% by weight and up to 2% by weight, such as up to 1% by weight, or, in some cases, up to 0.5% by weight, based on the total weight of the sum of the reaction mixture and the rubber particles.

In certain embodiments, the present invention is directed to free-flowing particles of any of the previous twenty-two paragraphs, wherein the coating has an inner surface adhered to the rubber particle and an outer surface, in which the solid particle anti-clumping agent is disposed at the outer surface of the coating, such as where a majority of the surface area of the solid particle anti-clumping agent is not disposed beneath the outer surface of the coating.

In other embodiments, the present invention is directed to methods comprising infilling a synthetic turf athletic field with free-flowing particles of any of the previous twenty-three paragraphs.

In some other embodiments, the present invention is directed to synthetic turf structures comprising: (a) a primary backing sheet; (b) a plurality of fibers tufted into the primary backing sheet and extending substantially vertically away therefrom; and (c) an infill disposed between the fibers, wherein the infill comprises free-flowing particles of any of the previous twenty-four paragraphs, such as where the synthetic turf structure is used as an athletic field, a playground, a safety surface, a running or walking trail, a landscaping walkway, or an equestrian footing application. In some of these embodiments, the primary backing sheet is constructed of woven or non-woven polypropylene or polyester, the plurality of fibers that are tufted into the primary backing sheet and extend away therefrom are constructed of a polymeric material, such as a polypropylene, a polyester, nylon, a polyolefin (including polypropylene or polyethylene), or other polymers and are, in some embodiments, colored so as to simulate natural grass or turf, and the synthetic turf structure also comprises a backing coating that is constructed of, for example, a polyurethane elastomer. The backing coating is adhered to the primary backing sheet and locks the fibers into the primary backing sheet.

In some respects, the present invention is directed to methods of making free-flowing particles. These methods comprise: (a) mixing rubber particles with an isocyanate-reactive composition comprising: (i) a polyol having a number average molecular weight of 1800 to 12,000; (ii) an aromatic diamine; and (iii) a catalyst for the reaction between hydroxyl groups and isocyanate groups to produce treated rubber particles; (b) mixing treated rubber particles produced in step (a) with a polyisocyanate to form rubber particles at least partially coated with a cured polyurethane-urea resin; and (c) mixing the coated rubber particles produced in step (b) with a solid particle anti-clumping agent.

Certain embodiments of the present invention are directed to method of the previous paragraph, wherein the free-flowing particles have an angle of repose that is less than 60° degrees when the particles are passed through a 10 mesh sieve.

In some embodiments, the present invention is directed to a method of either of the previous two paragraphs, wherein at least 85% by weight, such as at least 90% by weight, or, in some cases, at least 95% by weight, of the particles are pourable after 1 week at 140° F./95% relative humidity.

In certain embodiments, the present invention is directed to a method of any of the previous three paragraphs, wherein the rubber particles comprise crumb rubber, such as crumb rubber produced from recycled tires that contain a combination of different rubbers and other tire material components, such as thermoplastic polymers, carbon black, silica, clays, anti-oxidant compounds, anti-ozonant compounds, free sulfur, other free vulcanizing agents, oils, residual fibers, residual steel, or other residual contaminants.

Some embodiments of the present invention are directed to a method of any of the previous four paragraphs, wherein the rubber particles have an average particle size of 40 Mesh to 300 Mesh, as determined according to ASTM D5644-01: Standard Test Methods for Rubber Compounding Materials Determination of Particle Size Distribution of Recycled Vulcanizate Particulate Rubber, or, in some cases, no larger than 40 Mesh (approximately 400 microns), 80 Mesh (approximately 177 microns), 140 Mesh (approximately 105 microns), 200 Mesh (approximately 74 microns), or 300 Mesh (approximately 50 microns), as determined according to ASTM D5644-01.

In some cases, the present invention is directed to a method of any of the previous five paragraphs, wherein the rubber particles have an average particle size of 50 microns to 500 microns, and, in some cases, no larger than 500 microns, 400 microns, 300 microns, 200 microns, 100 microns, 75 microns, or 50 microns.

In some embodiments, the present invention is directed to a method of any of the previous six paragraphs, wherein the coating is a substantially or, in some cases, completely continuous film that covers at least 50%, at least 60%, at least 70%, at least 80%, at least 90%, or, in some cases, 100% of the surface of the rubber particle and/or has a maximum film thickness of no more than 20 microns, such as no more than 10 microns, no more than 8 microns, no more than 7 microns, or, in some cases, no more than 6 microns.

In certain embodiments, the present invention is directed to a method of any of the previous seven paragraphs, wherein the isocyanate-reactive composition comprises a polyol having a number average molecular weight of 3000 to 7000 or 5000 to 7000.

Some embodiments of the present invention are directed to a method of any of the previous eight paragraphs, wherein the polyol comprises a polyether polyol, such as those having at least 2, such as 2 or 3 hydroxyl groups per molecule and that is prepared, for example, by polymerization of epoxides, such as ethylene oxide, propylene oxide, butylene oxide, tetrahydrofuran, styrene oxide or epichlorohyrin, either on their own, in the presence of $BF_3$, or by a process of chemical addition of these epoxides, optionally as mixtures (such as mixtures of ethylene oxide and propylene oxide) or successively, to starting components having reactive hydrogen atoms, such as water, ammonia, alcohols, or amines.

In some embodiments, the present invention is directed to a method of any of the previous nine paragraphs, wherein the polyol having a number average molecular weight of 1800 to 12,000 is present in an amount of at least 50% by weight, such as at least 60% by weight, based on the total weight of the isocyanate-reactive composition.

In certain embodiments, the present invention is directed to a method of any of the previous ten paragraphs, wherein the aromatic diamine comprises at least one alkyl substituent in the ortho-position to a first amino group and two alkyl substituents in the ortho-position to a second amino group, such as where at least two of said alkyl substituents contain at least two carbon atoms, such as where the reactivity of said diamine towards isocyanates has not been reduced by electron attracting substituents, such as halogen, ester, ether or disulphide groups, as is the case, for example, with methylene-bis-chloroaniline (MOCA). In certain embodiments, the aromatic diamine contains at least one alkyl substituent in the ortho-position to a first amino group and two alkyl substituents having from 1 to 3 carbon atoms in the ortho-position to a second amino group, provided that two of these alkyl substituents contain two or three carbon atoms, such as is the case with 1-methyl-3,5-diethyl-2,4-diaminobenzene, 1-methyl-3,5-diethyl-2,6-diaminobenzene, 1,3,5-triethyl-2,6-diaminobenzene, and 3,5,3',5'-tetraethyl-4,4'-diaminodiphenylmethane.

In certain embodiments, the present invention is directed to a method of any of the previous eleven paragraphs, in which the aromatic diamine has a linear alkyl substituent having from 1 to 3 carbon atoms in both ortho-positions to each amino group, provided that two of the alkyl substituents contain two or three carbon atoms, such as those that are liquid at room temperature and miscible with polyols, particularly with polyether polyols, such as is the cases with 1-methyl-3,5-diethyl-2,4-diaminobenzene or a mixture of this compound with 1-methyl-3,5-diethyl-2,6-diaminobenzene.

In some embodiments, the present invention is directed to a method of any of the previous twelve paragraphs, wherein the aromatic amine is present in an amount of 5 to 50% by weight, such as 10 to 30% by weight, or, in some cases, 15 to 25% by weight, based on the total weight of the isocyanate-reactive composition.

Some embodiments of the present invention are directed to a method of any of the previous thirteen paragraphs, comprising, prior to mixing with the isocyanate-reactive composition, mixing the rubber particles with an aminosilane having the formula:

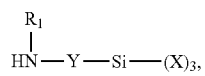

in which: (A) each X, which may be the same or different, is an organic group that is inert to isocyanate groups below 100° C., provided that at least one of these groups are alkoxy or acyloxy groups, such as where each X is an alkyl or alkoxy group having 1 to 4 carbon atoms, such as where each X is an alkoxy group having 2 carbon atoms; (B) Y is a linear or branched alkylene group containing 1 to 8 carbon atoms, such as a linear group containing 2 to 4 carbon atoms or a branched group containing 5 to 6 carbon atoms, such as a linear group containing 3 carbon atoms; and (C) $R_1$ is hydrogen or an organic group which is inert to isocyanate groups at a temperature of 100° C. or less, such as an alkyl, cycloalkyl, or aromatic group having 1 to 12 carbon atoms, or $R^1$ represents a group corresponding to the formula:

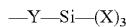

in which X and Y have the same meanings described above, such as where each X represents a methoxy, ethoxy, or propoxy group, and Y is a linear alkylene group containing 3 carbon atoms (i.e., a propylene group) and $R_1$ is hydrogen. In some of these embodiments, the aminosilane is present in an amount of 0.1 to 10% by weight, such as 1 to 5% by weight, or, in some cases, 2 to 4% by weight, based on the total weight of the isocyanate-reactive composition.

Some embodiments of the present invention are directed to a method of any of the previous fourteen paragraphs, wherein the isocyanate-reactive composition comprises a low molecular weight polyol having a number average molecular weight of from 250 to less than 1,800, such as from 250 to less than 1,500 or 250 to 800; a number averaged equivalent weight of from 80 to 750, such as from 85 to 300; and a number averaged isocyanate reactive group functionality of from 2 to 10, such as 2 to 4 or 2 to 3, such as polyether or polyester polyols containing primary and/or secondary hydroxyl groups. In some of these embodiments, such a low molecular weight polyol is present in an amount of 1 to 15% by weight, such as 5 to 15% by weight, based on the total weight of the isocyanate-reactive composition.

In certain embodiments, the present invention is directed to a method of any of the previous fifteen paragraphs, wherein the polyisocyanate comprises diphenylmethane 2,2'- and/or 2,4'- and/or 4,4'-diisocyanate (MDI) or a higher homolog of MDI (polymeric MDI), including a polyphenylpolymethylene polyisocyanate obtained, for example, by aniline-formaldehyde condensation followed by phosgenation. In some of these embodiments, the polyisocyanate has a viscosity, at 25° C., of no more than 300 mPa·s, when measured using a Brookfield DVE viscometer, spindle #6.

In some embodiments, the present invention is directed to a method of any of the previous sixteen paragraphs, wherein the polyisocyanate and isocyanate-reactive composition are each used in amounts such that the reaction mixture has an NCO Index of at least 90, such at least 99, or at least 100 and no more than 300, such as no more than 110 or, in some cases, no more than 105, such as where the NCO index is 105.

In certain embodiments, the present invention is directed to a method of any of the previous seventeen paragraphs, wherein the catalyst comprises (i) an organic tin compound, such as a dialkyl tin salt of carboxylic acid, such as dibutyl tin dilaurate, and (ii) a tertiary amine, such as 1,4-diazabicyclo-(2,2,2)-octane, such as where the relative weight ratio of (i) to (ii) is 20:80 to 80:20, such as 40:60 to 60:40.

In certain embodiments, the present invention is directed to a method of any of the previous eighteen paragraphs, wherein the reaction mixture has a flow time of less than 15, 10, or 5 seconds.

In some embodiments, the present invention is directed to a method of any of the previous nineteen paragraphs, wherein the reaction mixture is present in an amount of at least 0.5% by weight, such as at least 1% by weight or at least 2% by weight and up to 20% by weight, up to 10% by weight, or, in some cases, up to 6% by weight, based on the total weight of rubber particles.

Some embodiments of the present invention are directed to a method of any of the previous twenty paragraphs, wherein the solid particle anti-clumping agent comprises silica, such as fumed silica.

In some embodiments, the present invention is directed to a method of any of the previous twenty-one paragraphs, wherein the solid particle anti-clumping agent has an average particle size of at least 0.1 microns, such as at least 0.5 microns and no more than 10 microns, such as no more than 5 microns and/or is present in an amount of at least about 0.5% by weight, such as at least 1% by weight or, in some cases, at least 5% by weight and up to 20% by weight, such as up to 10% by weight, based on the total weight of the reaction mixture and/or is present in an amount of at least 0.05% by weight, such as at least 0.1% by weight, or, in some cases, at least 0.2% by weight and up to 2% by weight, such as up to 1% by weight, or, in some cases, up to 0.5% by weight, based on the total weight of the sum of the reaction mixture and the rubber particles.

In certain embodiments, the present invention is directed to a method of any of the previous twenty-two paragraphs, wherein the coating has an inner surface adhered to the rubber particle and an outer surface, in which the solid particle anti-clumping agent is disposed at the outer surface of the coating, such as where a majority of the surface area of the solid particle anti-clumping agent is not disposed beneath the outer surface of the coating In other embodiments, the present invention is directed to methods comprising infilling a synthetic turf athletic field with free-flowing particles made by a method of any of the previous twenty-three paragraphs.

In some other embodiments, the present invention is directed to synthetic turf structures comprising: (a) a primary backing sheet; (b) a plurality of fibers tufted into the primary backing sheet and extending substantially vertically away therefrom; and (c) an infill disposed between the fibers, wherein the infill comprises free-flowing particles made by a method of any of the previous twenty-four paragraphs, such as where the synthetic turf structure is used as an athletic field, a playground, a safety surface, a running or walking trail, a landscaping walkway, or an equestrian footing application. In some of these embodiments, the primary backing sheet is constructed of woven or non-woven polypropylene or polyester, the plurality of fibers that are tufted into the primary backing sheet and extend away therefrom are constructed of a polymeric material, such as a polypropylene, a polyester, nylon, a polyolefin (including polypropylene or polyethylene), or other polymers and are, in some embodiments, colored so as to simulate natural grass or turf, and the synthetic turf structure also comprises a backing coating that is constructed of, for example, a polyurethane elastomer. The backing coating is adhered to the primary backing sheet and locks the fibers into the primary backing sheet.

The non-limiting and non-exhaustive examples that follow are intended to further describe various non-limiting and non-exhaustive embodiments without restricting the scope of the embodiments described in this specification.

EXAMPLES

Example 1

Free-flowing coated rubber crumb particles were prepared using the ingredients and amounts (in grams) listed in Table 1. To prepare the particles, ingredient A was added to a suitable container with mixing and heated to 92° C. Then, ingredient B was added over 15 seconds. Ingredient C was then added over 30 seconds. The, ingredient D was added over 15 seconds. Ingredient E was then added over 30 seconds. The mixture was allowed to mix for 2 minutes prior to dumping ingredient F into the vessel. The resulting mixture was then allowed to mix for an additional two minutes to produce free-flowing coated rubber crumb particles. In Examples 1A-1C, the total coating weight was 4% of the weight of rubber crumb particles used. In Example 1D, the total coating weight was 2% of the weight of rubber crumb particles used. In Example 1E, the total coating weight was 6% of the weight of rubber crumb particles used.

All coatings processing similarly, with no observable differences. In each case, the resulting coated rubber crumb did not clump up.

TABLE 1

| Ingredient # | Example 1A | Example 1B | Example 1C | Example 1D | Example 1E |
|---|---|---|---|---|---|
| A[1] | 454 | 454 | 454 | 454 | 454 |
| B[2] | 0.43 | 0.43 | 0.43 | 0.43 | 0.43 |
| C[3] | 12.2 | 12.2 | 12.2 | 6.2 | 18.5 |
| D[4] | 0.9 | 0.9 | 0.9 | 0.9 | 0.91 |
| E[5] | 6 | 6 | 6 | 2.9 | 8.7 |
| F[6] | 1.4 | 1.4 | 1.4 | 1.4 | 1.4 |

[1] Rubber crumb
[2] Silquest™ A-1100, gamma-aminopropyltriethoxysilane, Momentive Performance Materials Inc.
[3] A blend of Bayflex® 110-80 Component B, from Bayer MaterialScience LLC, and Reactint® Yellow Dye X15, from Millikan Chemical. Bayflex® 110-80 Component B is a polyol system that includes an aromatic amine, diethyltoluenediamine, and a polyether polyol having a number average molecular weight of about 6000.
[4] A mixture of water (73% by weight) and dish detergent (27% by weight)
[5] Mondur® MR 5 (a polymeric diphenylmethane diisocyanate (pMDI) containing pure (monomeric) MDI, NCO content of at least 31.8 wt % and viscosity at 25° C. of 50-90 mPa · s), Bayer MaterialScience LLC.
[6] Cab-O-sil® M-5, fumed silica, Sigma-Aldrich Co.

Testing 200 grams of coated rubber crumb was put in an aluminum quart can. The aluminum can was put in a weather chamber at 140° F. (60° C.) and 95% relative humidity for 1 week. After 1 week, the rubber crumb was poured out of the can and into an aluminum pan immediately after removal from the weather chamber. The amount of coated rubber crumb remaining in the container was measured. Results are in Table 2.

TABLE 2

| Example | Coated Rubber Crumb Retained (straight pour) |
|---|---|
| 1D | 13.9 grams (7% by weight) |
| 1A | 17.1 grams (8.6% by weight) |
| 1E | 29.1 grams (14.6% by weight) |

Comparative Example 2

Coated rubber crumb particles were prepared using the same procedure and ingredients as in Example 1 except that the fumed silica was omitted. The total coating weight was 4% of the weight of rubber crumb particles used. The coated particles were tested in the same manner as described in Example 1. The coated rubber crumb retained in the aluminum can was 72.1 grams (36% by weight).

This specification has been written with reference to various non-limiting and non-exhaustive embodiments. However, it will be recognized by persons having ordinary skill in the art that various substitutions, modifications, or combinations of any of the disclosed embodiments (or portions thereof) may be made within the scope of this specification. Thus, it is contemplated and understood that this specification supports additional embodiments not expressly set forth herein. Such embodiments may be obtained, for example, by combining, modifying, or reorganizing any of the disclosed steps, components, elements, features, aspects, characteristics, limitations, and the like, of the various non-limiting embodiments described in this specification. In this manner, Applicant(s) reserve the right to amend the claims during prosecution to add features as variously described in this specification, and such amendments comply with the requirements of 35 U.S.C. §112, first paragraph, and 35 U.S.C. §132(a).

What is claimed is:

1. A free-flowing particle comprising:
   (a) a rubber particle, and
   (b) a coating deposited over at least a portion of the rubber particle, wherein the coating comprises:
      (1) a polyurethane-urea resin that is a reaction product of a reaction mixture comprising:
         (i) a polyol having a number average molecular weight of 1800 to 12,000;
         (ii) an aromatic diamine;
         (iii) a polyisocyanate; and
         (iv) a catalyst for the reaction between hydroxyl groups and isocyanate groups; and
      (2) a solid particle anti-clumping agent.

2. The free-flowing particle of claim 1, wherein the free-flowing particles have an angle of repose that is less than 60° degrees when the particles are passed through a 10 mesh sieve and wherein at least 85% by weight of the particles are pourable after 1 week at 140° F./95% relative humidity.

3. The free-flowing particle of claim 1, wherein the polyol having a number average molecular weight of 1800 to 12,000 comprises a polyether polyol having 2 or 3 hydroxyl groups per molecule and is present in an amount of at least 50% by weight, based on the total weight of the isocyanate-reactive composition.

4. The free-flowing particle of claim 1, wherein the aromatic diamine comprises at least one alkyl substituent in the ortho-position to a first amino group and two alkyl substituents in the ortho-position to a second amino group and is present in an amount of 10 to 30% by weight, based on the total weight of the isocyanate-reactive composition.

5. The free-flowing particle of claim 4, wherein the aromatic amine is 1-methyl-3,5-diethyl-2,4-diaminobenzene, 1-methyl-3,5-diethyl-2,6-diaminobenzene, 1,3,5-triethyl-2,6-diaminobenzene, and/or 3,5,3',5'-tetraethyl-4,4'-diaminodiphenylmethane.

6. The free-flowing particle of claim 1, wherein the isocyanate-reactive composition further comprises an aminosilane having the formula:

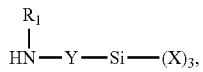

in which: (A) each X, which may be the same or different, is an organic group that is inert to isocyanate groups below 100° C., provided that at least one of these groups are alkoxy or acyloxy groups, such as where each X is an alkyl or alkoxy group having 1 to 4 carbon atoms; (B) Y is a linear or branched alkylene group containing 1 to 8 carbon atoms; and (C) $R_1$ is hydrogen or an organic group which is inert to isocyanate groups at a temperature of 100° C. or less, or $R^1$ represents a group corresponding to the formula:

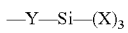

in which X and Y have the same meanings described above.

7. The free-flowing particle of claim 1, wherein the polyisocyanate comprises polymeric MDI having a viscosity, at 25° C., of no more than 300 mPa·s, when measured using a Brookfield DVE viscometer, spindle #6.

8. The free-flowing particle of claim 1, wherein the reaction mixture has a flow time of less than 15 seconds.

9. The free-flowing particle of claim 1, wherein the reaction mixture is present in an amount of at least 0.5% by weight up to 10% by weight, based on the total weight of rubber particles.

10. The free-flowing particles of claim 1, wherein the solid particle anti-clumping agent comprises silica that is present in an amount of at least 0.05% by weight and up to 2% by weight, based on the total weight of the sum of the reaction mixture and the rubber particles.

11. The free-flowing particle of claim 1, wherein the coating has an inner surface adhered to the rubber particle and an outer surface, in which the solid particle anti-clumping agent is disposed at the outer surface of the coating, such that a majority of the surface area of the solid particle anti-clumping agent is not disposed beneath the outer surface of the coating.

12. A method comprising:
   infilling a synthetic turf athletic field with free-flowing particles of claim 1.

13. A synthetic turf structure comprising:
(a) a primary backing sheet;
(b) a plurality of fibers tufted into the primary backing sheet and extending substantially vertically away therefrom; and
(c) an infill disposed between the fibers, wherein the infill comprises a free-flowing particle of claim 1.

14. A method of making the free-flowing particles of claim 1 comprising:
(a) mixing rubber particles with an isocyanate-reactive composition comprising:
(i) a polyol having a number average molecular weight of 1800 to 12,000;
(ii) an aromatic diamine; and
(iii) a catalyst for the reaction between hydroxyl groups and isocyanate groups to produce treated rubber particles;
(b) mixing treated rubber particles produced in step (a) with a polyisocyanate to form rubber particles at least partially coated with a cured polyurethane-urea resin; and
(c) mixing the coated rubber particles produced in step (b) with a solid particle anti-clumping agent.

15. The method of claim 14, wherein the aromatic diamine comprises at least one alkyl substituent in the ortho-position to a first amino group and two alkyl substituents in the ortho-position to a second amino group.

16. The method of claim 14, comprising:
prior to mixing with the isocyanate-reactive composition, mixing the rubber particles with an aminosilane having the formula:

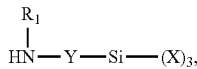

in which: (A) each X, which may be the same or different, is an organic group that is inert to isocyanate groups below 100° C., provided that at least one of these groups are alkoxy or acyloxy groups; (B) Y is a linear or branched alkylene group containing 1 to 8 carbon atoms; and (C) $R_1$ is hydrogen or an organic group which is inert to isocyanate groups at a temperature of 100° C. or less or $R^1$ represents a group corresponding to the formula:

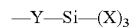

in which X and Y have the same meanings described above.

17. The method of claim 14, wherein the polyisocyanate comprises polymeric MDI having a viscosity, at 25° C., of no more than 300 mPa·s, when measured using a Brookfield DVE viscometer, spindle #6.

18. The method of claim 14, wherein the solid particle anti-clumping agent comprises silica.

19. The method of claim 18, wherein:
(1) the polyol having a number average molecular weight of 1800 to 12,000 is present in an amount of at least 50% by weight, based on the total weight of the isocyanate-reactive composition;
(2) the aromatic amine is present in an amount of 10 to 30% by weight, based on the total weight of the isocyanate-reactive composition;
(3) the solid particle anti-clumping agent is present in an amount of at least 0.05% by weight and up to 2% by weight, based on the total weight of the stun of the reaction mixture and the rubber particles, and
(4) the reaction mixture is present in an amount of at least 0.5% by weight up to 10% by weight, based on the total weight of rubber particles.

20. The method of claim 18, wherein the coating has an inner surface adhered to the rubber particle and an outer surface, in which the solid particle anti-clumping agent is disposed at the outer surface of the coating, such as where a majority of the surface area of the solid particle anti-clumping agent is not disposed beneath the outer surface of the coating.

21. A method comprising infilling a synthetic turf athletic field with free-flowing particles made by the method of claim 18.

* * * * *